UNITED STATES PATENT OFFICE.

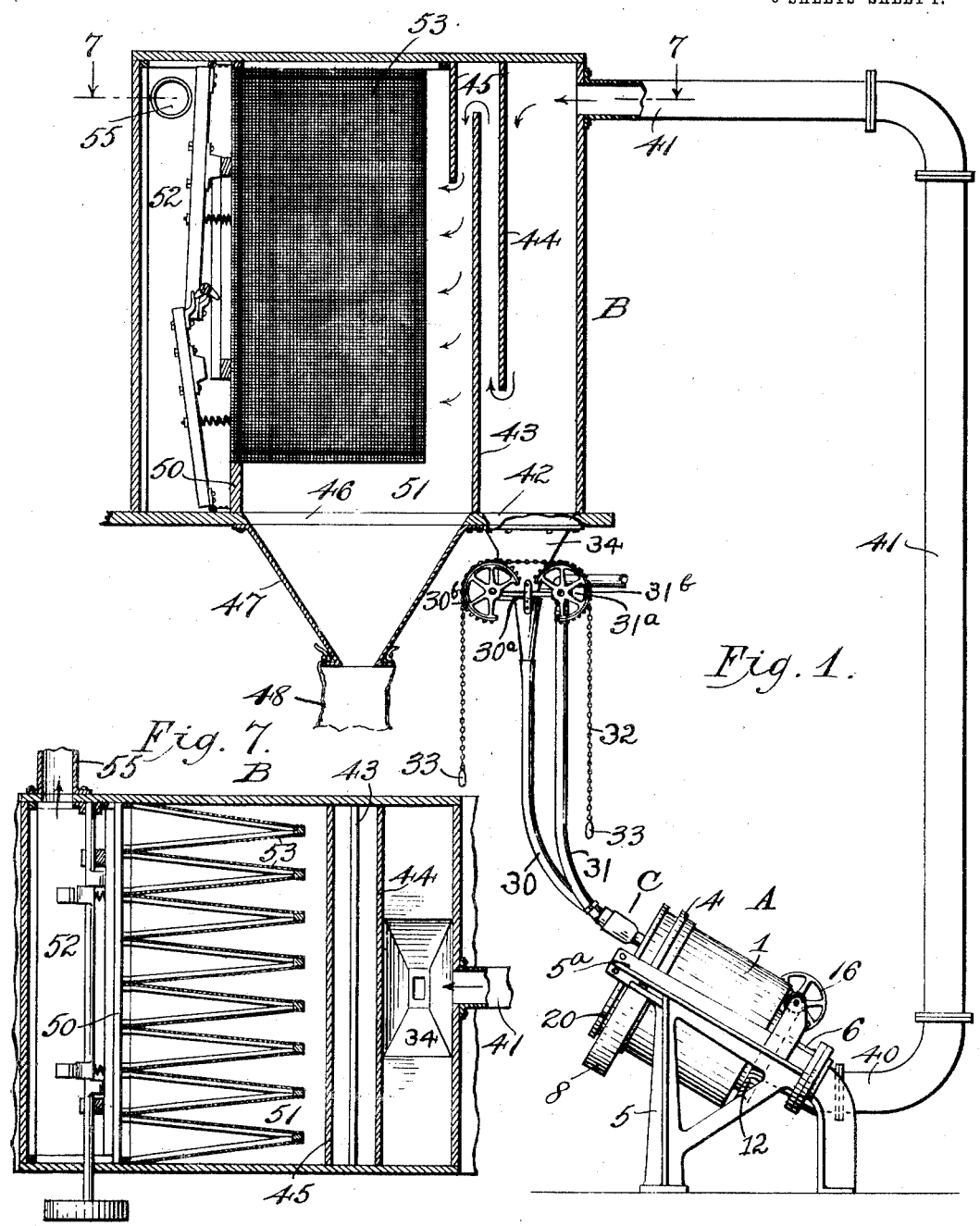

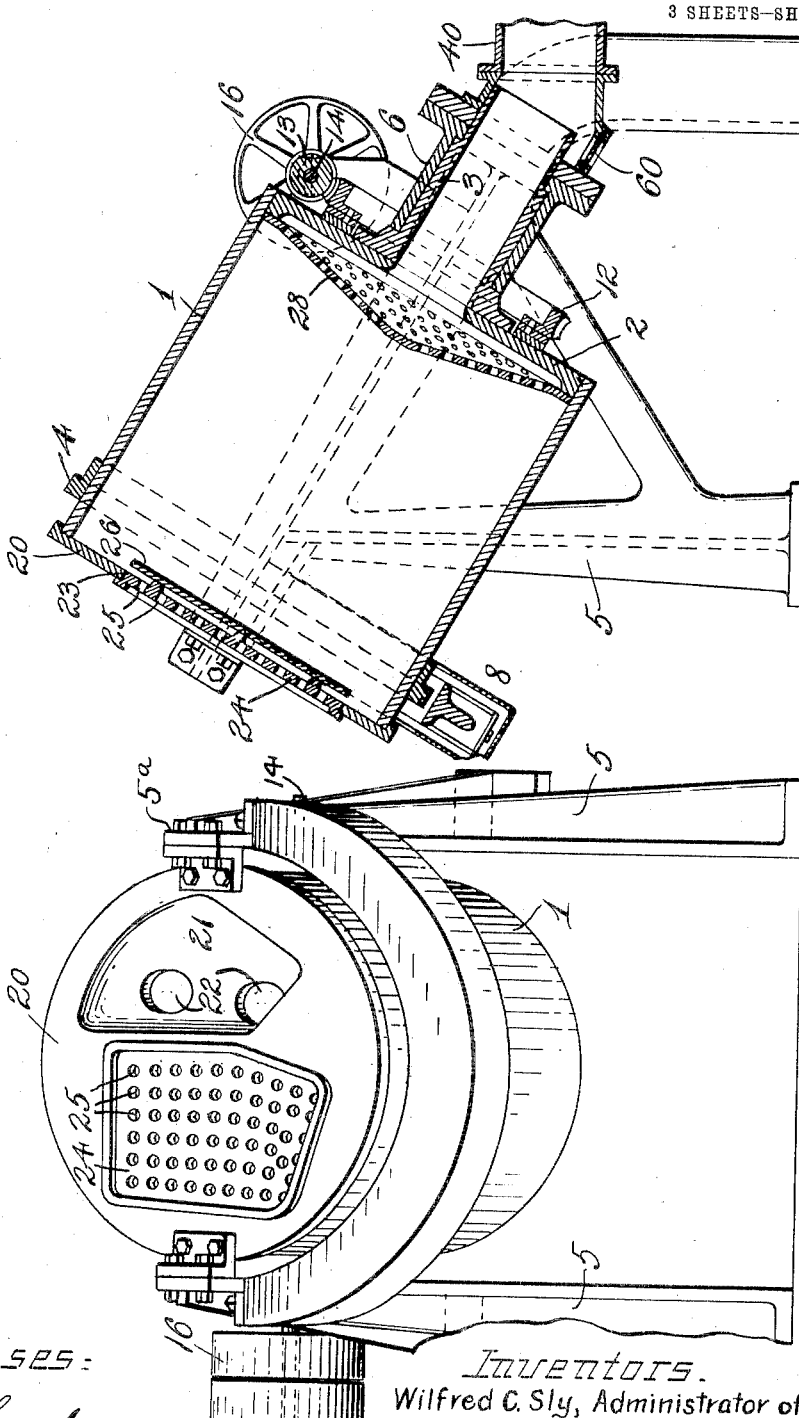

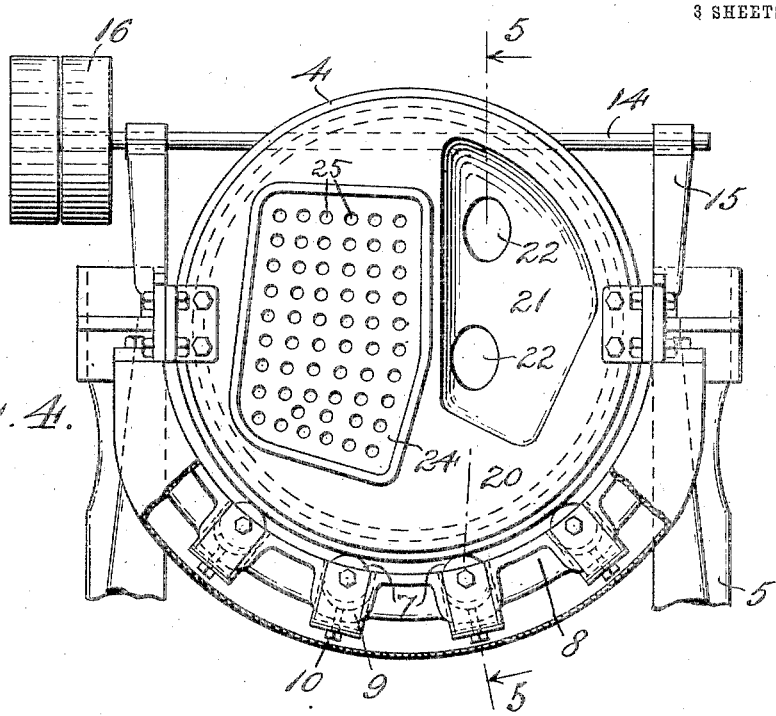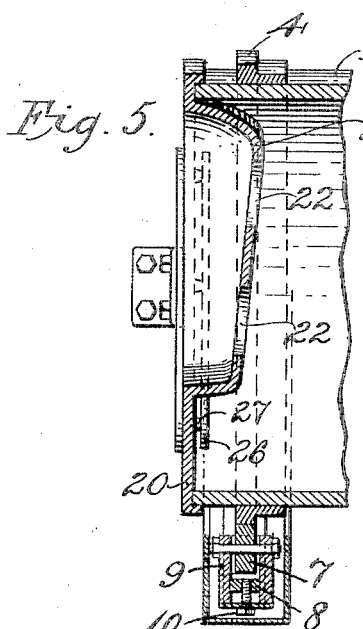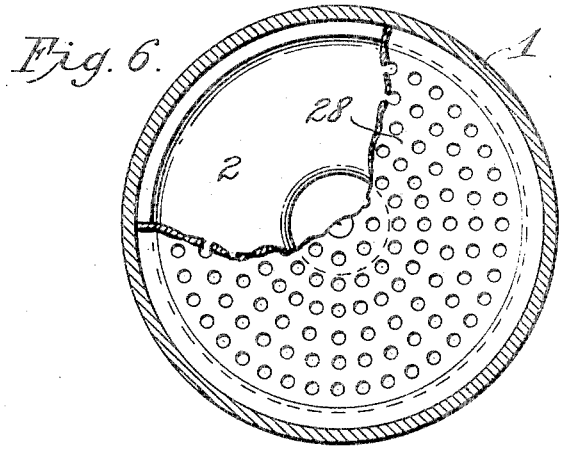

WILLIAM W. SLY, DECEASED, LATE OF CLEVELAND, OHIO, BY WILFRED C. SLY, ADMINISTRATOR, OF CLEVELAND, OHIO, AND WILFRED C. SLY, OF CLEVELAND, OHIO, ASSIGNOR TO THE W. W. SLY MANUFACTURING COMPANY, OF CLEVELAND, OHIO, A CORPORATION OF OHIO.

SAND-BLAST APPARATUS.

1,116,505.      Specification of Letters Patent.      Patented Nov. 10, 1914.

Application filed November 15, 1911. Serial No. 660,523.

*To all whom it may concern:*

Be it known that WILLIAM W. SLY, deceased, and WILFRED C. SLY, both of the city of Cleveland, in the county of Cuyahoga and State of Ohio, did jointly invent new and useful Improvements in Sand-Blast Apparatus, and that the said WILFRED C. SLY, administrator of the said WILLIAM W. SLY, deceased, and the said WILFRED C. SLY, in his own proper person and as an individual, do hereby declare the following to be a full, clear, and exact description of the same, reference being had to the accompanying drawings.

This invention relates to a class of devices employed by foundrymen, whereby sand and scale may be rapidly and efficiently cleaned from the surface of even a very intricate casting, and this with the smallest possible cost for labor, power, and materials.

The two methods heretofore most frequently employed have been the tumbling-barrel method and the sand-blast method. In the former method the castings are placed in a revolving barrel, with or without the addition of slugs, billets, balls, or other striking devices, and rotated at a slow speed until the jarring and abrasion have scoured away the sand and scale and shattered it through apertures formed in the sides of the barrel. This method is slow and uneconomical, it subjects the castings to an unnecessary amount of hard usage, and it is entirely ineffective for intricate castings because of the impossibility of bringing the interior parts thereof to the action of the hammering means. The sand-blast method consists in the scouring of the castings by means of fine sharp sand blown violently thereagainst by a forceful current of air, and, while this method avoids all of the objections raised to the former method, it gives rise to new difficulties, which are, in their way, just as troublesome. Chief among these difficulties has been the injury to the lungs and nasal passages of the workmen caused by the extremely dusty condition of the air in the vicinity where this process is being carried on, since the sand even though originally of a rather uniform and material size becomes broken up by the impact into a fine dust and this taken in connection with the fine particles of scale and the slivers of metal eroded from the surface of the castings is extremely injurious. Furthermore the amount of sand which will be ejected in an hour by a sand blast nozzle is very considerable indeed and it has heretofore been difficult to collect the same and return it to a position where it can be used a second time. Then, too, some method must be employed for separating from the sand the dust and scale so that only efficient grains will be delivered to the nozzle at the next operation.

The object of the present invention is the provision of an apparatus which shall render available the desirable and efficient features of both said processes, while avoiding the objections inherent in each, and to this end we have employed a combination of the two methods.

According to our invention we revolve the castings at a comparatively low speed in a modified form of tumbling barrel, while subjecting them to the action of a sand blast. The action of the tumbling barrel is to rotate and shift the castings so as to expose all sides thereof to the action of the sand and at the same time to collect and deliver to a suction conduit the sand, dust, and scale removed by the abrasion. This sand and dust is then returned to a separating chamber wherein the dust and small particles are removed and discharged while the sand is returned directly to the blast nozzle for second use.

Our invention resides both in the process and in the apparatus by which this process is carried out and will be understood more thoroughly by reference to the drawings accompanying and forming a part of this application wherein is illustrated one embodiment of our improved sand blast apparatus, although it is to be understood that these drawings are illustrative merely and that our invention is not limited to the particular construction disclosed herein.

In these drawings, Figure 1 is a side elevational view of a sand blast apparatus constructed in accordance with our invention, a portion of the separating chamber being shown in cross section; Fig. 2 is a front view of the tumbling barrel; Fig. 3 a longitudinal vertical cross sectional view taken through the center of said tumbling barrel; Fig. 4 a face view of the forward end of said barrel; Fig. 5, a detail cross sectional view taken along the broken line 5—5 of Fig. 4; Fig. 6 a view of the inner end of said tumbling barrel, the cover being removed and a portion of the conical bottom plate being broken away; and Fig. 7, a horizontal cross sectional view taken along the broken line 7—7 of Fig. 1.

Describing the parts by reference characters, the tumbling barrel is represented at A, the separating chamber at B, and the sand blast nozzle at C. The tumbling barrel consists of a substantially cylindrical shell 1, having its lower end closed by a centrally perforated plate 2, said plate having secured to its outer face the axial hub or trunnion 3, said hub being hollow and communicating with the interior of the barrel through the perforation in the plate 2. The opposite end of the shell is left open and adjacent to this open end is surrounded by a tire 4. This tumbling barrel is rotatably supported in an inclined position by a frame 5, the hub or trunnion 3 being received in a sleeve 6 carried by one part of said frame, and the tire 4 being engaged by a plurality of anti-friction rollers 7 carried by another part of said frame. The inclination of the axis of the barrel is preferably between 20 and 45 degrees. The rollers 7 are conveniently mounted upon a band 8 rigidly bolted to the frame and are preferably supported in slidable brackets 9, adjustable toward and from the center of the barrel by means of set screws 10, whereby they may be caused to bear equally against the tire 4 and to hold the barrel in alinement with the sleeve 6. Rigidly secured to the outer face of the plate 2 is an annular worm gear 12 and meshing with said gear is a worm 13 carried by a shaft 14 journaled in bearings 15 secured to the frame 5 and having a pulley 16 whereby it may be driven.

Rigidly secured to an extension 5ª of the frame is a stationary head or closure member 20, said head making a close but not tight fit with the open end of the shell 1. One part of said head is formed with a depression 21 provided with port-holes 22, 22 through which the sand blast nozzle or "gun" is pointed. The bottom of this depression is preferably inclined slightly from the plane of rotation of the barrel so that the nozzles or guns will be introduced into the barrel at the proper angle, although the same result could be attained by properly shaping the nozzles themselves. Furthermore, two ports 22 are preferably employed, one above the other so that nozzles can be inserted into both simultaneously and the operation correspondingly expedited. Another portion of the cover is formed with an opening 23 adapted for the reception of a door 24 provided with perforations 25 for the admission of air, the inner face of this portion of the cover being separated from the interior of the barrel by a baffle plate 26 spaced from the cover by bosses 27. The lower end of the barrel is provided with a perforated plate 28 spaced from the bottom a sufficient distance to permit the free passage of air and sand.

Mounted in one or both of the port holes 22 is a sand blast nozzle or gun C which may, within the scope of our invention, take any known or approved shape, but which preferably is that disclosed in the application of William W. Sly, filed April 14, 1911, Ser. No. 620,997. The flexible conduit whereby sand is conveyed to this nozzle is indicated at 30 and the air supply tube at 31. These tubes are governed by valves indicated generally at 30ª and 31ª, which may be of the type illustrated in the said application No. 620,997, or any other suitable type and are here shown as provided with sprocket wheels 30ᵇ and 31ᵇ respectively around which is passed a chain 32 having depending handles 33 by means of which the supply may be regulated. Sand is delivered to the valve 31ª by means of a hopper 34 and the method of delivering sand to said hopper and returning thereto the sand ejected through said nozzle will now be described.

Secured to the lower end of the sleeve 6 and surrounding the discharge end of the hub 3 is a collector pipe 40 having an upturned portion 41 communicating with the separating chamber B. This chamber preferably takes the form of a substantially closed box of rectangular or other convenient shape having in its floor an aperture 42 communicating with the hopper 34 and preferably spaced directly beneath the end of the pipe 41. At the opposite side of the aperture 42 from the wall of the chamber is a partition 43 extending from side to side of the chamber and from the bottom nearly to the top, whereby a sand box is divided off from the rest of the chamber. The pipe 41 preferably communicates with the interior of the chamber adjacent to the top thereof and at right angles to the partition 43, and parallel to this partition and between it and the pipe 41 is introduced a baffle plate 44 running from side to side of the chamber and extending downwardly a considerable distance toward the bottom thereof so as to cause the sand-laden air entering through the pipe 41 to be directed forcibly downward and then deflected violently upward around the lower edge of this baffle plate so that the inertia of the sand may tend to carry it to the bottom of the sand box and into the hopper 34. A second baffle plate 45 is mounted upon the opposite side of the partition 43 so as again to deflect downwardly the air passing over the top of said partition.

Formed in the floor of the second compartment is an aperture 46 beneath which is secured a funnel or hopper 47 communicating with a suitable discharge pipe 48. On the opposite side of the aperture 46 from the partition 43 is a partition 50 whereby the second compartment of the separating chamber is divided into a dust box 51 and air box 52, communication between said dust box and air box being had through a plurality of vertical screens 53 set in serrate arrangement above the aperture 46 as fully set forth and claimed in the patent to William W. Sly, granted Oct. 7, 1902, No. 710,624. Communicating with the air box 52 is a pipe 55 connected with an exhaust fan (not shown.)

In the embodiment illustrated herein and particularly disclosed in Fig. 3, the horizontal position of the collecting pipe 40 taken in connection with the inclination of the hub 3 forms an angular aperture at their point of meeting, which is governed by a slide valve 60. The result is that sand and dust ejected through the hub 3 will cascade across this aperture whereupon the air entering through said aperture under the influence of the fan connected with the pipe 55 will pick up such sand and dust and transport it to the separator.

The operation of our device is as follows:—The door 24 of the closure member is removed and a suitable number of castings placed in the barrel after which the door is replaced. One or more sand-blast nozzles or guns being already in place in the ports 22, the barrel is rotated by means of the worm gear, and the sand and air blast turned on. The combined tumbling of the barrel and abrasion by the sand will scour the castings in a very efficient manner, as will be obvious, the spent sand, dust, and scale being discharged through the hub 3 and collector pipe 40 into the separating chamber as above described. A part of the air aspirated into the pipe 55 is delivered by the nozzle itself, a portion enters the pipe 40 through the opening governed by the slide valve 60, and the remainder is drawn through the perforations 25. It is found that if the baffle plate 26 be omitted sufficient sand and dust rebounds from the surfaces of the castings and escapes through the perforations 25 to render the atmosphere in the vicinity of the barrel very unpleasant, but that this baffle plate corrects this fault without materially affecting the admission of air. Arrived in the separating chamber B, the air and sand are first thrown downwardly after which the air is sharply deflected upwardly around the baffle plate 44 whereupon the greater inertia of the unbroken sand will throw it downwardly into the hopper 34 ready for a second use while the finer particles of dust are carried into the dust box 51. Owing to the larger area and smaller velocity of air in this chamber some of this dust settles of its own accord into the hopper 46, while the remainder is caught upon the screens 53 so that the air finally passing through the pipe 55 is dust-free. The deposited dust is discharged through the pipe 48. New sand to replace that broken up and lost is supplied directly to the barrel A as may be required and elevated to the sand box by the air in the suction pipe 40.

It is obviously necessary to cover the bottom of the tumbling barrel with a perforated plate of some sort in order to prevent small castings from passing into the hub 3. It has been found, however, that if a flat plate be used, the friction of the castings thereagainst combined with the suction of the air will frequently prevent the castings from rolling around in the barrel as they should, not only failing to become thoroughly exposed to the sand blast but also largely obstructing the flow of air. In order to overcome this difficulty, the plate is made conical as illustrated in Fig. 3, thus insuring the tumbling of the castings in the barrel.

While we have necessarily described our invention in detail, we do not propose to be limited to such details, except as the same may be positively included in the claims hereto annexed or may be rendered necessary by the prior state of the art.

Having thus described our invention, what we claim is:

1. In a sand blast apparatus, the combination with a supporting frame, of a rotary receptacle journaled therein in an inclined position, said receptacle comprising a substantially cylindrical shell having a centrally perforated plate secured to its lower end and a hollow hub carried by said plate and forming a discharge spout, a perforated bottom plate extending substantially from one wall of said receptacle to the other and spaced inwardly from said first plate whereby castings and the like may be maintained out of contact with said first plate and sand and scale may be discharged thereon, and a sand blast nozzle supported by said frame and arranged to discharge into said receptacle.

2. In a sand blast apparatus, the combination of a substantially cylindrical receptacle rotatably mounted in an inclined position, a perforated plate traversing said receptacle adjacent to its lower end and serving in connection with the walls of the receptacle to define a pocket for the reception of castings and the like, means for rotating said receptacle, and means for supplying sand under pressure into said receptacle and for directing the same into said pocket.

3. In a sand blast apparatus, the combination of a rotary receptacle, means supporting the same in an axially inclined position, a fixed cover for said receptacle having one or more openings for the application of a sand blast nozzle thereto, said cover being provided with an opening for the admission of air to the interior of the receptacle, and a perforated cover for said opening, said last cover being provided with a baffle plate spaced therefrom and adapted to project inwardly into the receptacle for the purpose of admitting air to said receptacle and preventing the sand from escaping.

4. In a sand blast apparatus, the combination of a rotary receptacle, means supporting the same, a fixed closure member for one end of said receptacle having one or more openings for the application of a sand blast nozzle thereto, said closure member being perforated for the admission of air to the interior of the receptacle, said closure member being provided with a baffle plate spaced therefrom and adapted to project inwardly into the receptacle for the purpose of preventing the sand from escaping through the perforations.

5. In a sand blast apparatus, the combination of a rotary receptacle, means for supporting the same in an axially inclined position, an exhausting device connected with the lower portion of said receptacle, means for discharging sand under pressure into said receptacle, and an air admitting device for the upper portion of the receptacle provided with means for preventing the passage of sand therethrough.

6. In a sand blast apparatus, the combination of a rotary receptacle mounted in an inclined position and having a central outlet hub at the lower end thereof, a perforated plate traversing said receptacle adjacent to such lower end, an exhaust conduit communicating with said hub, there being an air admission aperture opening into said exhaust conduit beneath said hub, means for rotating said receptacle, means for supplying sand laden air into said receptacle, and means for aspirating air through said exhaust conduit.

7. In a sand blast apparatus, the combination of a rotary receptacle, means for supporting the same, an exhausting device connected with the lower portion of said receptacle, a non-rotatable closure member for one end of said receptacle, means for discharging sand under pressure into said receptacle through said closure member, and an air admitting device for said closure member provided with means for preventing the passage of sand therethrough.

8. In a sand blast apparatus, the combination of a rotary receptacle, means supporting the same in an axially inclined position, a hollow hub secured to the lower end of said receptacle, the diameter of the hub being materially less than that of the receptacle; a perforated bottom for said receptacle inside of said hub and extending from side to side thereof, an exhausting device connected with said hub, and means for discharging sand under pressure into said receptacle.

9. In a sand blast apparatus, the combination of a rotary receptacle, means supporting the same in an axially inclined position, a perforated conical bottom traversing said receptacle, an exhausting device connected with the lower portion of said receptacle, and means for discharging sand under pressure into said receptacle.

10. In a sand blast apparatus, the combination, of a rotary receptacle, means for supporting said receptacle in an axially inclined position, a perforated conical plate secured across said receptacle with its apex turned toward the upper end of the receptacle, an exhaust conduit connected with the receptacle below said plate; and means for discharging sand under pressure into said receptacle.

11. In a sand blast apparatus, the combination of a rotary receptacle having an open end, means for supporting the same in a position other than horizontal, a perforated conical bottom plate traversing said receptacle adjacent to its lower end and having its apex presented upwardly, means for discharging sand under pressure into the upper end of said receptacle, and means for permitting the escape from said receptacle of the sand passing through said perforated plate.

12. In a sand blast apparatus, in combination, a rotatable receptacle having an open end, means for supporting said receptacle in an axially inclined position with the open end upward, a non-rotatable closure member for the open end of said receptacle, a part of said closure member being inclined toward the lower end of said receptacle, and said inclined portion being formed with a port hole, a sand blast nozzle adapted to be received in said port hole and to discharge in the direction of the lower corner of said receptacle, and means for permitting the escape from the lower portion of said receptacle of the sand delivered thereto by said nozzle.

13. In a sand blast apparatus, in combination, a rotatable receptacle having an open end, means for supporting said receptacle, a non-rotatable closure member for the open end of said receptacle, a part of said closure member being inclined inwardly and said inclined portion being formed with vertically spaced port-holes, a sand blast nozzle adapted to be received in either of said port holes and to discharge in the direction of the lower side of the closed end of said receptacle, and means for permitting the escape from said closed end of the sand delivered thereto by said nozzle.

In testimony whereof, I hereunto affix my signature as executor and as an individual.

WILLIAM W. SLY,
By WILFRED C. SLY,
*Administrator.*
WILFRED C. SLY.

Witnesses:
BRENNAN B. WEST,
HAROLD S. SMITH.